S. PESKOLICH.
SAFETY DEVICE FOR MINE CAGES.

Reissued May 25, 1920. APPLICATION FILED APR. 21, 1920. 2 SHEETS—SHEET 1. 14,864.

Inventor.
Steve Peskolich
by Wm. E. Maguire
his Atty's.

S. PESKOLICH.
SAFETY DEVICE FOR MINE CAGES.

Reissued May 25, 1920. APPLICATION FILED APR. 21, 1920. 2 SHEETS—SHEET 2.

14,864.

Inventor
Slave Peskolich
by W. Pierce Maguire
his Att'y.

UNITED STATES PATENT OFFICE.

SLAVE PESKOLICH, OF BUTTE, MONTANA.

SAFETY DEVICE FOR MINE-CAGES.

14,864. Specification of Reissued Letters Patent. Reissued May 25, 1920.

Original No. 1,334,116, dated March 16, 1920, Serial No. 315,943, filed August 7, 1919. Application for reissue filed April 1, 1920. Serial No. 375,906.

*To all whom it may concern:*

Be it known that I, SLAVE PESKOLICH, of Butte, in the county of Silverbow and State of Montana, have invented certain new and useful Improvements in Safety Devices for Mine-Cages; and I do hereby declare the following to be a full, clear, and exact description of the invention, such as will enable others skilled in the art to which it appertains to make and use the same.

This invention relates to safety devices for mine elevators. It is well known that serious accidents are not infrequent where no safety devices are employed for detaching the car or cage of a mine elevator from its hoisting cable in the event that the hoisting motor is not stopped when the car or cage has reached a predetermined point in its upward travel.

It is the object of this invention to provide an improved means for effectively and quickly severing the cable from which the car or cage is suspended when the latter reaches a predetermined danger point.

Figure 1:
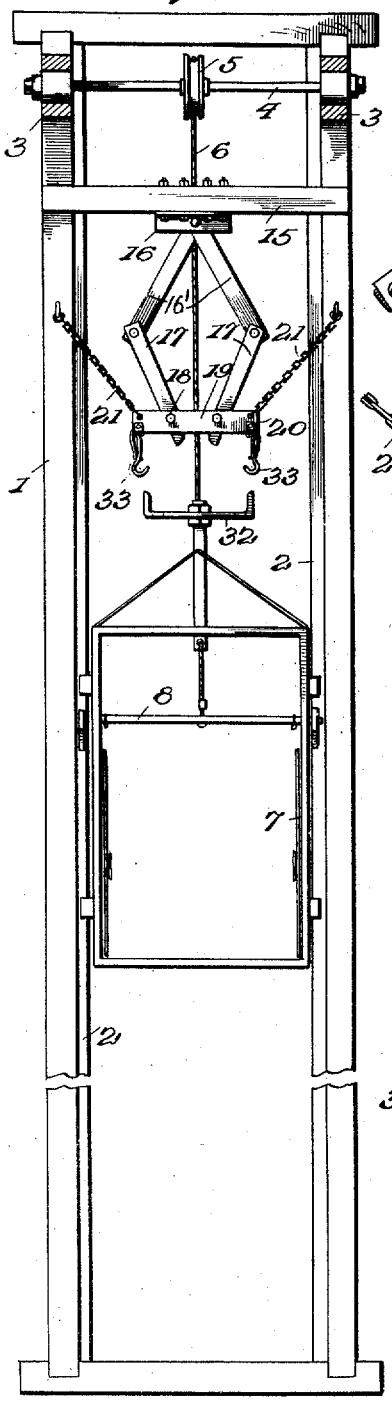
Figure 2:
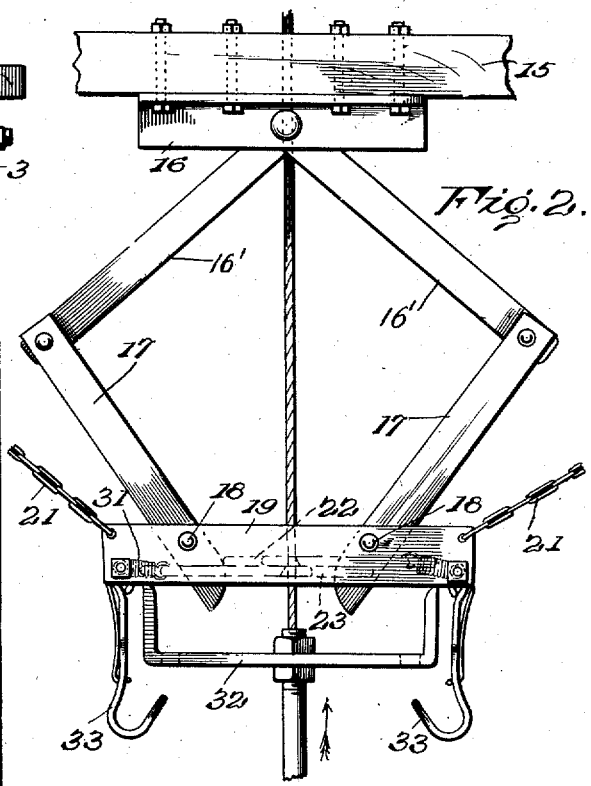
Figure 5:
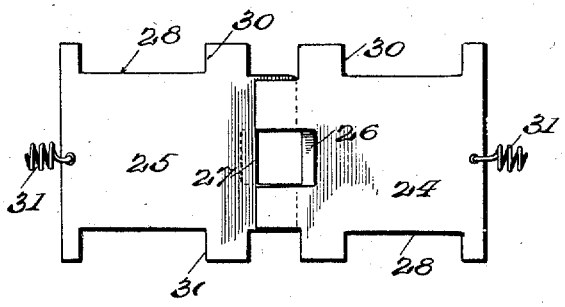
Figure 4:
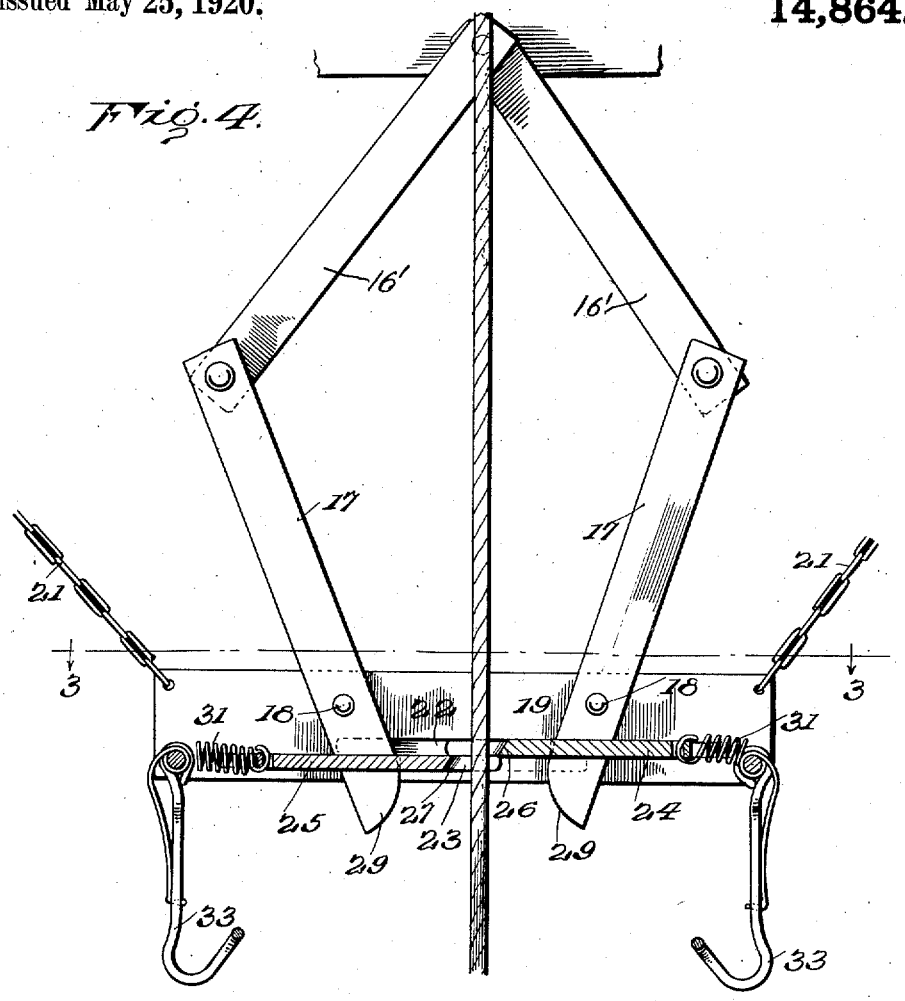
Figure 3:
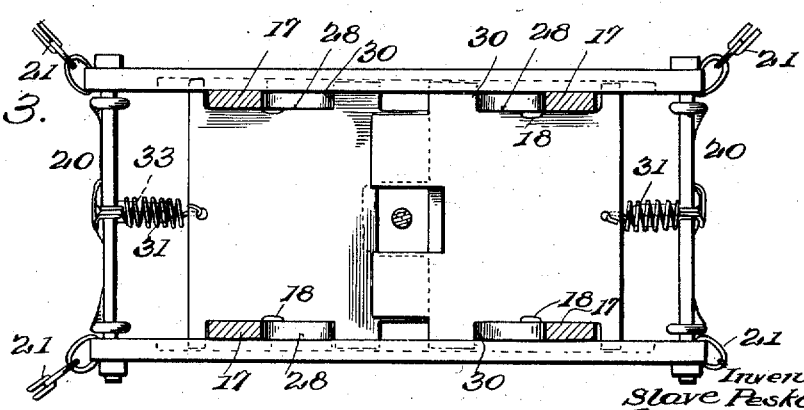

In the drawings, Figure 1 is a view in side elevation of a portion of the shaft frame work and of the upper part of a car showing my improved device in position. Fig. 2 is an enlarged view of my safety device with only fragmentary portions of the shaft frame work and the car and showing the device in cable cutting position. Fig. 3 is a horizontal sectional view on line 3—3, Fig. 4, and Fig. 4 is a view similar to Fig. 2, the cutting blades being shown in section and in inoperative position. Fig. 5 is a detailed plan view of the cutting blades.

I have shown in conventional form the frame work of an elevator shaft at 1, guide rails or tracks 2, cross beams 3, a shaft 4, sheave 5, and hoisting cable 6. I have also illustrated in similar manner a cage 7 having a carrier 8 with which the hoisting cable 6 is connected.

15 indicates a pair of beams disposed on opposite sides of the tracks 2 with sufficient space between them to allow of uninterrupted passage of the hoisting cable. These beams form a support for angle irons 16 to which are pivoted the upper ends of pairs of links 16′ operatively connected to the upper end of pairs of levers 17, such levers near their lower ends being pivoted, as at 18, to bars 19 forming part of a frame 20 which is suspended by chains 21 from the uprights of the shaft frame-work. Each of the bars 19 is provided with horizontally disposed grooves 22, 23, on its inner face, these grooves forming guide-ways for a pair of cutting blades in the form of plates 24, 25, the cutting edges 26, 27 being designed for shear-like overlapping. The blades are shown in plan view in Fig. 5, and each is cut away at its sides, as at 28, to receive the lower ends of the levers 17 by which the blades are moved to sever a cable, the levers being beveled as at 29, for engagement with the shoulders 30 formed by the cut out portions at the sides of the plates. Maintenance of the blades in normal inactive position is effected by coiled springs 31 secured to the blade and to the frame 20.

A crown plate 32 secured to the supporting cables of the cage and forming part of the connection between such cables and the hoisting cable 6 is the means for operating the safety device.

At each end of the frame 20 is a spring actuated hook 33 adapted to engage and support the crown plate 32 of the cage, such hooks being auxiliary to cage supporting means (not shown) with which all elevator cages are equipped for supporting the cage when the latter becomes detached from its hoisting cable.

In the hoisting of a cage where my improved safety device is employed if the cage is raised to the point where the crown plate 32 will engage the frame 20 the latter, in the continued upward movement of the cage, will be forced upwardly causing the links and connected levers to fold toward each other. This causes the lower ends of the levers to act on the blades 24, 25, and move them toward each other with a consequent severing of the cable 8 which passes between them. Just prior to the engagement between the crown plate 32 and the frame 20, the former will have contacted with hooks 33 which being forced against the tension of their springs will then fly back into position with their hooked ends under the plate 32. Severance of the cable transfers the weight of the cage to the hooks 33 and these will draw the frame 20 down until it is wholly suspended by the chains 21. The descent of the cage to this position is effective for throwing the safety devices carried by the cage into operation.

The advantages of my invention are apparent. It will be seen that I have provided a very simple device for effectively severing a hoisting cable by the movement of the cage beyond a given danger point, and that the device has but few parts which are not liable to readily get out of order.

I claim as my invention:

1. Means for severing the hoisting cable of an elevator including a frame, cutting means slidably mounted on said frame, levers carried by said frame and adapted to actuate said cutting means, and means for actuating said levers.

2. Means for severing the hoisting cable of an elevator including a movable frame, cutting means carried by said frame and movable relatively thereto, and levers actuated by the movement of said frame to effect relative movement of said cutting means, in combination with means carried by said elevator for moving said frame.

3. Means for severing the hoisting cable of an elevator including a movable frame, a support therefor, cutting means carried by said frame and movable relatively thereto, pairs of levers each pivotally connected at one end to said frame and adapted to actuate said cutting means, a fixed support, and means interposed between said fixed support and said levers for actuating the latter, in combination with means for moving said frame.

4. Means for severing the hoisting cable of an elevator including a movable frame through which said cable passes, a support for said frame, cutting blades slidably mounted in said frame, levers carried by said frame and adapted to actuate said cutting blades, and means for actuating said levers.

5. Means for severing the hoisting cable of an elevator including a movable frame through which said cable passes, said frame comprising spaced apart side bars having horizontally disposed grooves on their opposed faces, a cross piece connecting said bars, cutting blades spanning the space between said bars and slidable in the grooves thereof, levers pivotally connected at one end to said frame and adapted to actuate said cutting blades, a fixed support, and links connecting the opposite ends of said levers with said fixed support, in combination with means for moving said frame.

6. A safety device for elevators including a movable frame through which the hoisting cable of the elevator is designed to pass, a support for said frame, cutting blades slidably mounted in said frame, levers pivotally connected to said frame and adapted to actuate said cutting blades, means for actuating said levers, and spring hooks adapted to hold said elevator when said cutting blades have severed the hoisting cable.

In testimony whereof I have signed this specification.

SLAVE PESKOLICH.